United States Patent
Hickey et al.

(10) Patent No.: US 8,028,153 B2
(45) Date of Patent: Sep. 27, 2011

(54) DATA DEPENDENT INSTRUCTION DECODE

(75) Inventors: Mark J Hickey, Rochester, MN (US);
Adam J Muff, Rochester, MN (US);
Matthew R Tubbs, Rochester, MN (US); Charles D Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 12/191,337

(22) Filed: Aug. 14, 2008

(65) Prior Publication Data
US 2010/0042812 A1    Feb. 18, 2010

(51) Int. Cl.
*G06F 9/30* (2006.01)
(52) U.S. Cl. .......................... 712/222; 712/210
(58) Field of Classification Search .................. None
See application file for complete search history.

(56) References Cited

U.S. PATENT DOCUMENTS

| | | | | |
|---|---|---|---|---|
| 5,913,047 A * | 6/1999 | Mahalingaiah et al. | ...... | 712/213 |
| 5,931,943 A * | 8/1999 | Orup | ............................. | 712/222 |
| 6,014,735 A * | 1/2000 | Chennupaty et al. | ......... | 712/210 |
| 6,651,159 B1 * | 11/2003 | Ramesh et al. | ................ | 712/209 |
| 7,613,762 B2 * | 11/2009 | Steele, Jr. | ........................ | 708/504 |
| 7,664,935 B2 * | 2/2010 | Coon et al. | ..................... | 712/210 |
| 7,818,542 B2 * | 10/2010 | Shen et al. | ..................... | 712/210 |
| 7,836,278 B2 * | 11/2010 | Sudhakar et al. | .............. | 712/209 |
| 2001/0002483 A1* | 5/2001 | Roberts | .......................... | 712/213 |
| 2004/0199748 A1* | 10/2004 | Sperber et al. | ................ | 712/210 |
| 2005/0188179 A1* | 8/2005 | Henry et al. | ................... | 712/210 |

* cited by examiner

*Primary Examiner* — Eric Coleman
(74) *Attorney, Agent, or Firm* — Wood, Herron & Evans, LLP

(57) ABSTRACT

A circuit arrangement and method support data dependent instruction decoding, whereby instructions are decoded, in part, using decode data that is stored in operand registers identified by such instructions. An instruction may include an opcode and at least one operand that identifies a register. During execution of the instruction, the instruction is first decoded using the opcode, and then decode data stored in the operand register is retrieved and used to further decode the instruction, e.g., to select from among a plurality of operations or instruction types associated with the same opcode.

25 Claims, 6 Drawing Sheets

DATA DEPENDENT INSTRUCTION DECODE

FIELD OF THE INVENTION

The invention is generally related to data processing, and in particular to processor architectures and execution units incorporated therein.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an opcode that identifies the type of instruction, as well as one or more operands that identify input and/or output data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases. Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by providing a circuit arrangement and method support data dependent instruction decoding, whereby instructions are decoded, in part, using decode data that is stored in operand registers identified by such instructions. In some embodiments of the invention, for example, an instruction may include an opcode and at least one operand that identifies a register. During execution of the instruction, the instruction is first decoded using the opcode, and then decode data stored in the operand register may be retrieved and used to further decode the instruction, e.g., to select from among a plurality of instruction types associated with the same opcode. In addition, other data stored in the operand register may be used as input data for the instruction.

Therefore, consistent with one aspect of the invention, a circuit arrangement may include a register file including a plurality of registers, where the plurality of registers includes a first register, and where the first register stores operand data in an operand portion thereof and decode data in a decode portion thereof. The circuit arrangement also includes execution logic coupled to the register file and configured to execute a first instruction that identifies the first register in the register file, and decode logic coupled to the execution logic and configured to use the decode data stored in the decode portion of the first register identified by the first instruction to decode the first instruction.

Consistent with another aspect of the invention, a method of executing instructions using execution logic coupled to a register file includes executing a first instruction that identifies a first register from the register file using the execution logic, where the first register stores operand data in an operand portion thereof and decode data in a decode portion thereof. The method also includes, during execution of the first instruction, using the decode data stored in the decode portion of the first register identified by the first instruction to decode the first instruction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention employ data dependent instruction decoding that utilizes data stored in an operand register for an instruction to assist in the decoding of the instruction. The operand register may also include operand data that is used as input data for the instruction. Furthermore, decode data may be written to a register for use in controlling the decoding of future instructions that reference the register as an operand register. By doing so, the number of instruction types that may be supported in a given ISA can be expanded without requiring an expansion in the width of the opcode portion of an instruction.

Due to the ever expanding number of registers and new instructions in modern microprocessor cores, the address widths present in an instruction encoding continue to widen, and fewer instruction opcodes are available, making it more difficult to add new instructions to existing architectures without resorting to inelegant tricks that have drawbacks such as source destructive operations. While the invention has applicability with numerous other applications, including in connection with instructions and registers other than floating point instructions and registers, the embodiments described hereinafter take advantage of the fact that many applications, and in particular, many graphical applications, do not require the full floating point precision of a processor. As such, a subset of the bits used to represent the significands of the floating point values processed in such applications can often be repurposed for use in storing decode data without adversely impacting the mathematical calculations required in such applications. The hereinafter described embodiments therefore achieve a smaller opcode footprint by using one opcode for a group of related operations, and placing additional decoding information in the unused bits of the source data to the next instruction to facilitate decoding of the particular operation in the group.

Hardware and Software Environment

Figure 1:
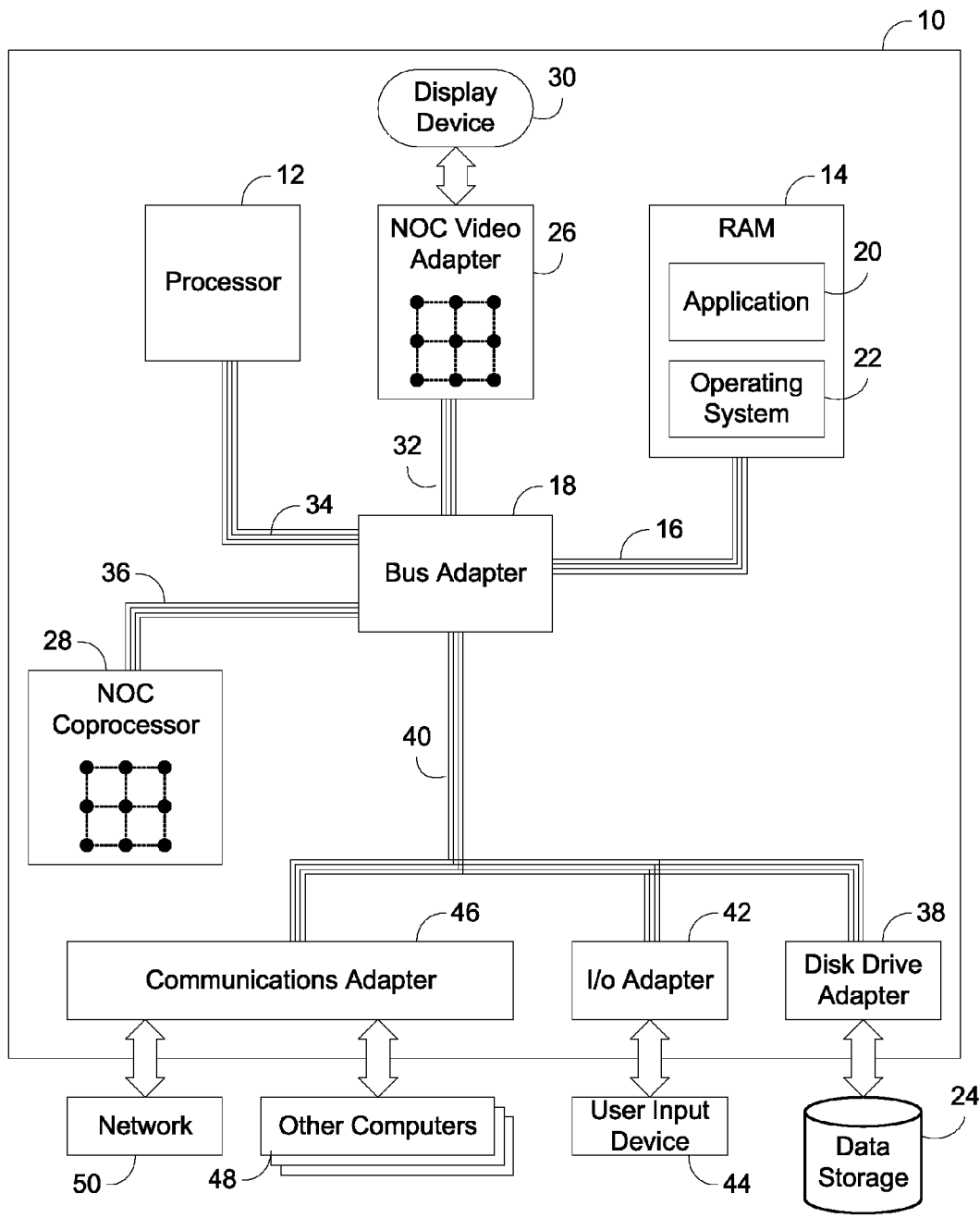
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
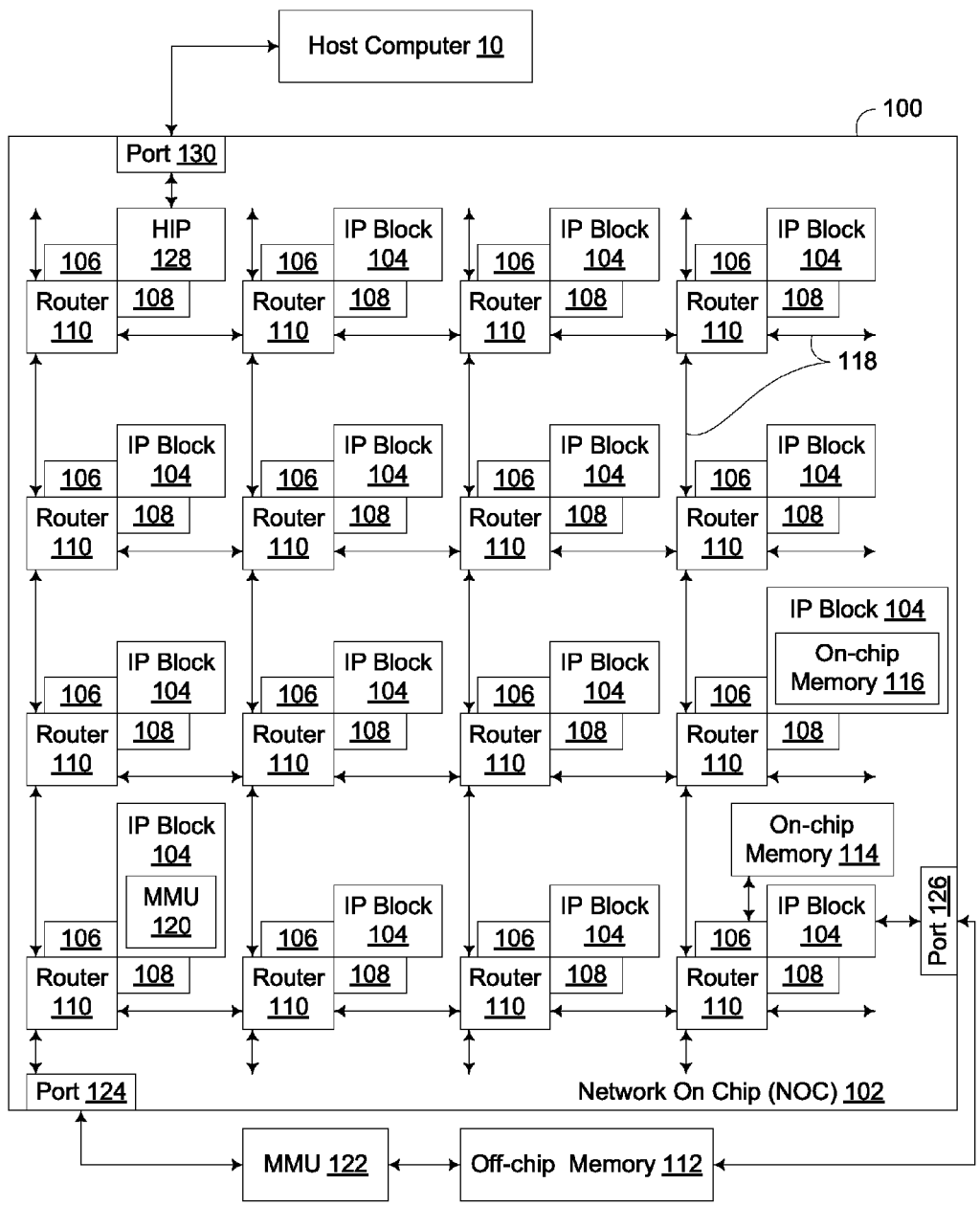
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bidirectional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
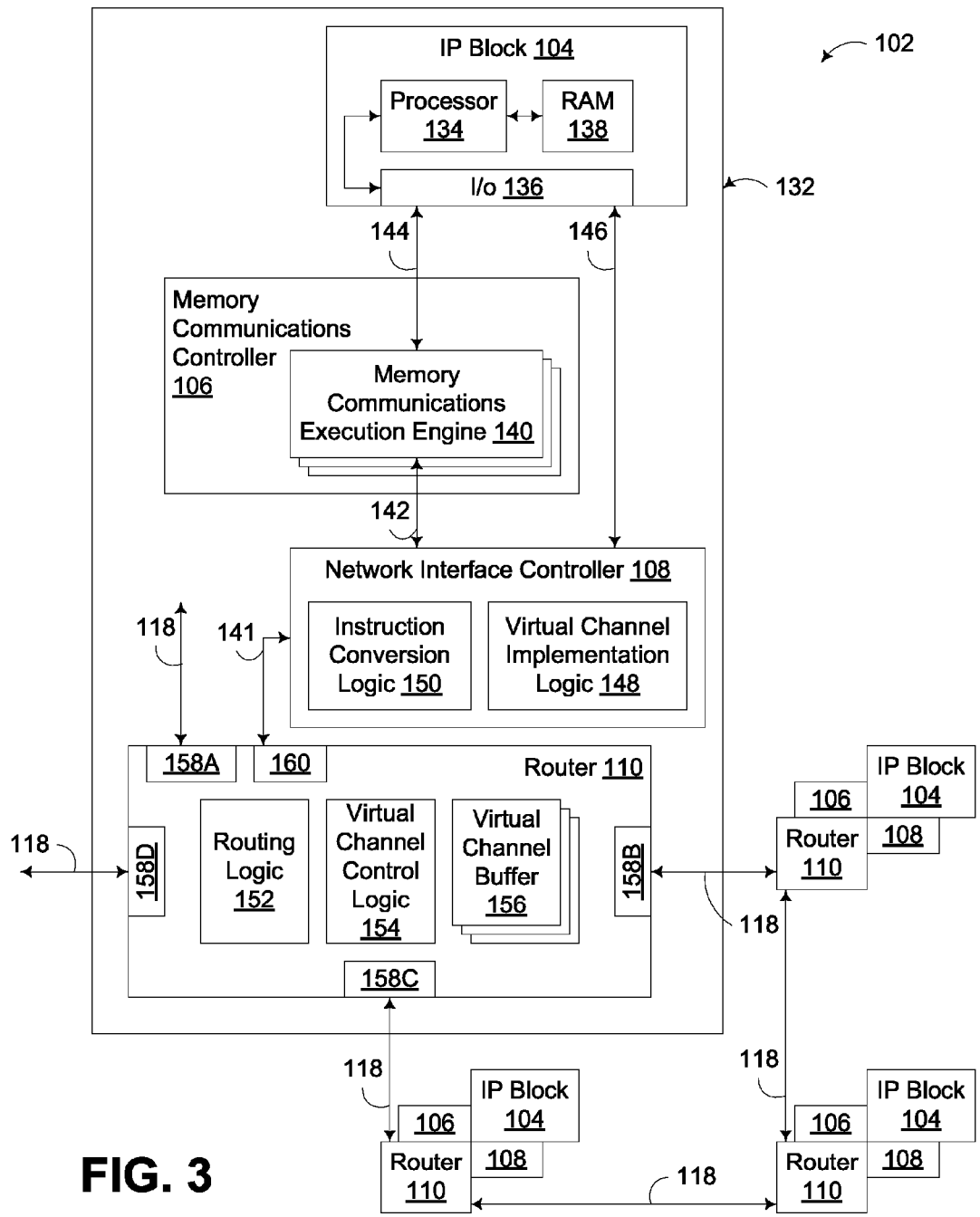
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
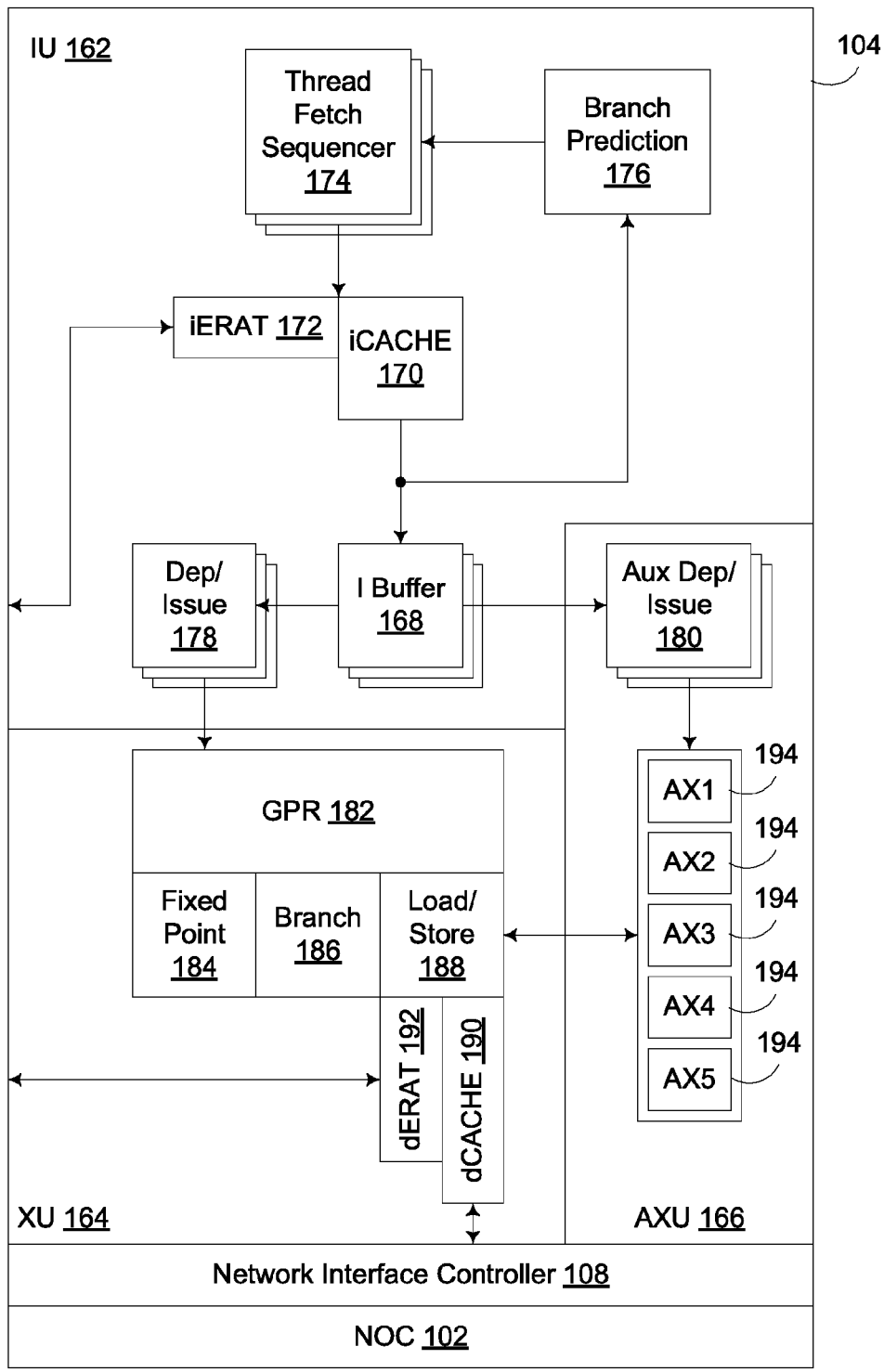
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Data Dependent Instruction Decode

Figure 5:
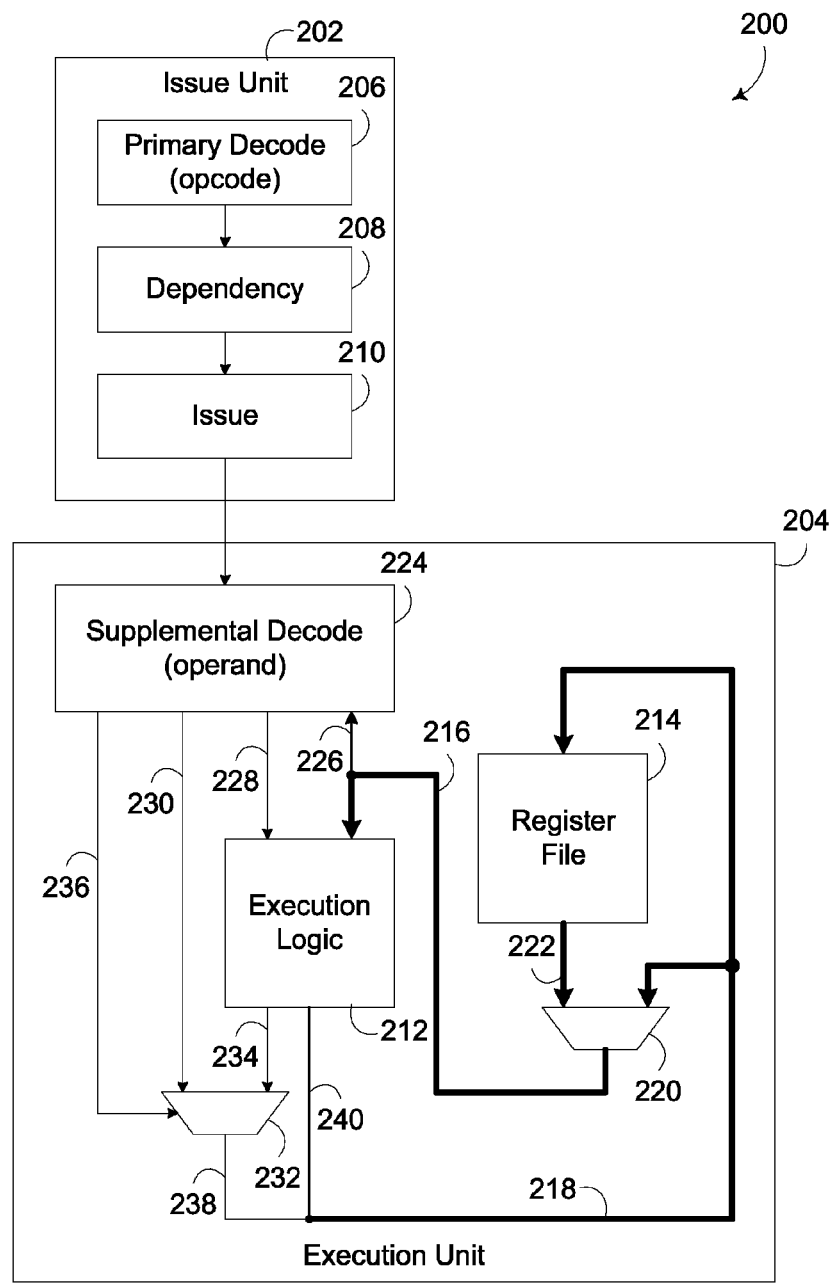
FIG. 5 is a block diagram of a processing unit supporting data dependent instruction decoding consistent with the invention, and capable of being implemented within an IP block from the NOC of FIG. 2.

Turning now to FIG. 5, this figure illustrates an exemplary processing unit 200 incorporating data dependent instruction decode consistent with the invention. Processing unit 200 may be implemented, for example, as a processor core in an IP block such as an IP block 104 from FIGS. 1-4. In the alternative, processing unit 200 may be implemented in other processor architectures that issue and execute instructions, including single or multi-core microprocessors or microcontrollers.

Processing unit 200 includes an issue unit 202 coupled to an execution unit 204. Issue unit 202 is configured to receive instructions from one or more instruction streams and issue those instructions to execution unit 204 for execution. In the example implementation, execution unit 204 is implemented as a floating point execution unit, and as such, issue unit 202 is configured to receive floating point instructions.

Issue unit 202 includes primary decode logic 206 that performs a primary decode of a received instruction based upon the primary opcode for the instruction. Dependency logic 208 resolves any dependencies that may arise between the current instruction and any preceding instructions, while issue logic 210 schedules the issuance of instructions to execution unit 204. While issue unit 202 in the illustrated embodiment is a single-threaded issue unit, it will be appreciated that the invention may also be utilized in multi-threaded processors where instructions from multiple hardware threads may be scheduled for execution by execution unit 204.

Execution unit 204 processes instructions issued to the execution unit by issue unit 202, and includes execution logic 212 that receives operand (input) data and stores target (result) data from and to a register file 214. Execution unit 204 may be implemented as a number of different types of execution units, e.g., a fixed point unit, floating point unit, or a specialized execution unit such as a graphics processing unit, encryption/decryption unit, coprocessor, XML processing unit, etc., and may be implemented either as a vector or scalar-based unit. In addition, execution unit 204 may be pipelined in some embodiments. In the implementation illustrated in FIG. 5, for example, execution logic 212 is implemented as a single precision multi-stage scalar floating point pipeline, e.g., as might be used for image processing, which processes floating point instructions issued to the execution unit by issue unit 202.

Register file 214 includes a plurality (e.g., 64) of scalar floating point registers, each including 32-bit words. Source registers are provided to execution logic 212 via an input 216, and output by execution logic 212 to register file 214 via an output 218. Bypass logic 220, including a bypass multiplexer, is used to multiplex an output 222 of register file with output 218 to enable result data output by execution logic 212 to bypass register file 214 and be provided directly to execution logic 212 whenever the result of one instruction serves as the input of a subsequent instruction.

One skilled in the art will recognize that multiple execution units 204 may be provided in processing unit 200, e.g., separate fixed point, floating point, and vector units, and that multiple issue units may be used to issue different types of instructions in an instruction stream. Furthermore, it will be appreciated that execution logic 212 will be particularly configured to implement the various instructions supported by execution unit 204, and thus, the configuration of execution logic 212 will vary greatly in different embodiments.

To implement data dependent instruction decode consistent with the invention, supplemental decode logic 224 is provided in execution unit 204, and is used to provide supplemental decoding of an instruction based upon decode data stored in one or more operand registers identified by the instruction. It is assumed for this embodiment that decode data is embedded in a decode portion of a floating point register, with an operand portion of the floating point register used to store a floating point value. The decode data typically includes a plurality of decode values that are mapped to different instructions or operations that will be executed for a given primary opcode associated with an instruction type.

Supplemental decode logic 224 first determines if supplemental decoding is required based upon the primary opcode for the instruction. If not, no supplemental decoding is required, and execution logic 212 may execute the instruction in a conventional manner. If, however, supplemental decoding is required, supplemental decode logic 224 receives at input 226 the decode portion of a source register output from register file 214 (or alternatively, bypass logic 220). Based upon the decode data, decode logic 224 outputs one or more control signals via control lines 228 to execution logic 212 to control the execution logic to select the desired operation to be performed for the current instruction.

Decode logic 224 may also output decode data 230 to be stored in a destination register for use by a subsequent instruction having an appropriate opcode. The decode data 230 is multiplexed by a multiplexer 232 with the bits corresponding to the decode portion from a result floating point value output by execution logic 212 (on line 234). Decode logic 224 outputs a select signal to multiplexer 232 on line 236 to pass either the decode data 230 or the bits corresponding to the decode portion from the result floating point value over line 238. Line 238 is merged with the remaining bits from the result floating point value (referred to as a result portion, and provided on line 240) and passed over output 218 to register file 214 and bypass logic 220.

Thus, during execution of an instruction having an opcode that requires supplemental decoding, decode logic 224 will retrieve decode data from a source register identified by the instruction and control execution logic 212 to perform the operation associated with the retrieved decode data. In addition, decode logic 224 may also output decode data for a subsequent instruction and merge the decode data with a result value that is written back into a destination register in the register file for use in decoding a subsequent instruction that identifies the destination register. In addition, operating data stored in the source register is used as input data for the instruction.

In contrast, during execution of an instruction having an opcode that does not require supplemental decoding, decode logic 224 will skip retrieving any decode data from a source register, and the entire contents of each source register identified by the instruction will be used in a conventional manner during execution of the instruction by execution logic 212. Furthermore, no decode data will be provided by decode logic 224, and the result floating point value output by execution logic 212 (on lines 234 and 240) will be passed to the destination register over output 218.

Figure 6:
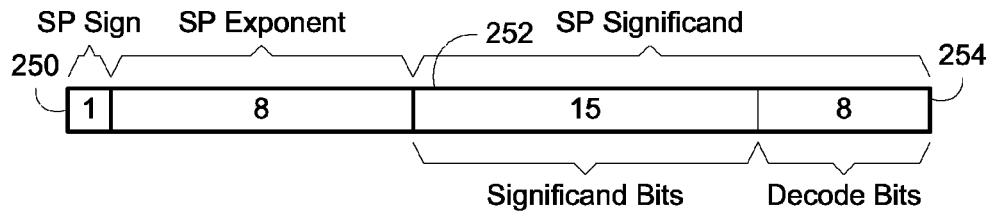
FIG. 6 is a block diagram of an exemplary floating point register format suitable for use in the processing unit of FIG. 5.

The decode data detected and used by supplemental decode logic 224 may be stored in an operand register in various formats. For example, as shown at 250 in FIG. 6, in one illustrative embodiment, where each operand register is a single precision floating point register, a floating point format may be configured similarly to an IEEE 754 single precision floating point format. In the IEEE 754 single precision format, a one bit sign field is provided, along with an eight bit single precision (SP) exponent field and 23 bit SP significand field. The SP significand field, however, is broken into two subsets, a first (most significant) subset 252 of 15 bits allocated to significand data, and a second (least significant) subset 254 of 8 bits allocated to decode data. Of note, the decode data is desirably stored in the least significant bits of the SP significand field, although doing so is not required. The resulting format provides an operand portion consisting of the SP sign field, the SP exponent field, and the first subset 252 of the SP significand field, and a decode portion consisting of the second subset 254 of the SP significand field. It will be appreciated that a multitude of alternate formats may be used to store or decode data in a register. For example, a greater or lesser number of bits allocated to decode data to provide support for a greater or lesser number of different types of instructions. In addition, for other floating point formats, or fixed point or other non-floating-point formats, decode data may be stored elsewhere in a register.

Figure 7:
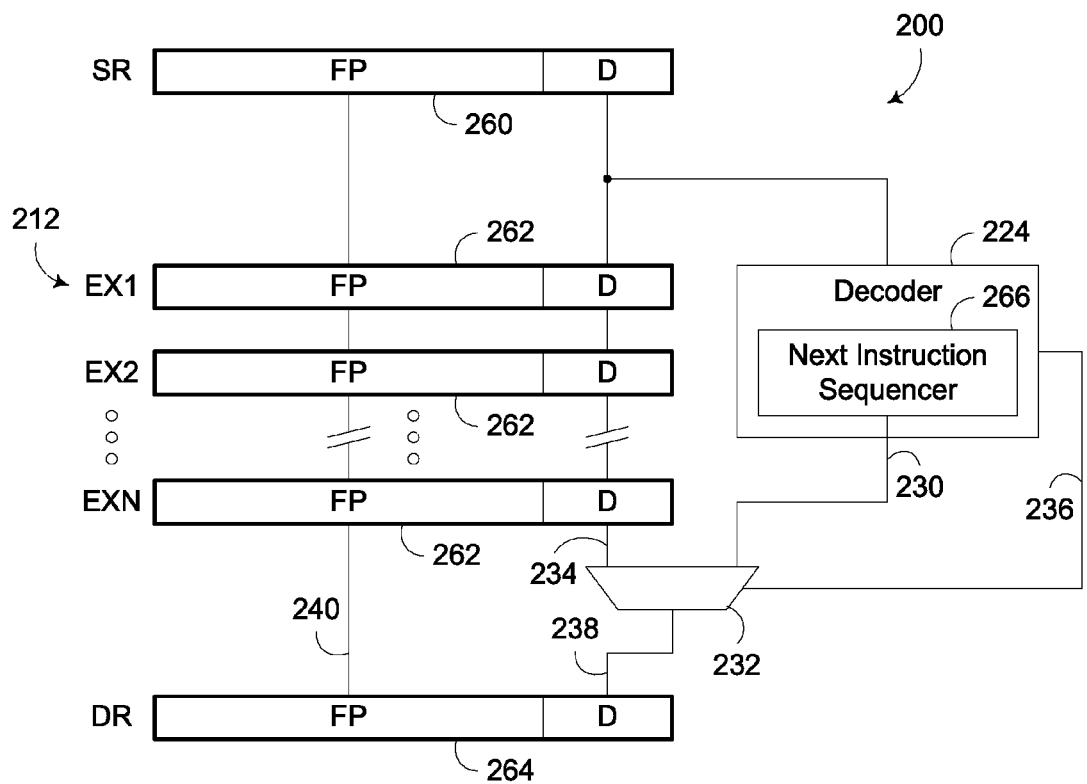
FIG. 7 is a block diagram of data flow in the processing unit of FIG. 5, illustrating the retrieval and storage of decode data in a floating point register.

FIG. 7 next illustrates the retrieval and storage of decode data in a floating point register within processing unit 200. In particular, a source register 260, as might be identified in an instruction, includes an operand portion FP within which is stored a floating point value and a decode portion D within which is stored decode data for the current instruction. Execution logic 212 is illustrated as including a plurality (N) of pipeline stages 262, also designated as EX1-EXN, and illustrating the flow of the data from the source register 260 through each pipeline stage 262. It will be appreciated that at one or more of pipeline stages 262, the operand data from register 260 (as well as potentially operand data from one or more other registers) will be manipulated to generate a result for the instruction being executed, which result is output to a destination register 264. Of note, the operand portion FP passes directly through the pipeline such that result data is stored in the destination register 264 in a conventional manner. The decode data from the decode portion of the source register, however, is passed to supplemental decode logic 224 to decode which of a plurality of operations should be performed for the given instruction. In addition, multiplexer 232 passes either the bits from the decode portion output from execution logic 212 (line 234) or the decode data output by a next instruction sequencer 266 in decode logic 224. Thus, the decode data for a subsequent instruction is selectively stored in destination register 264 by decode logic 224.

Next instruction sequencer 266 may store one or more predetermined sequences of decode values in order to implement one or more predetermined sequences of operations. Thus, for each subsequent instruction sharing the same opcode, a predetermined sequence of operations may be performed. Sequences may be identified, for example, by specifying a seed value as the decode data for a first instruction. In addition, sequences may end automatically, or may be delimited by a decode value associated with a "complete" status for a sequence. It will be appreciated in other embodiments, no sequencer may be provided. In addition, a developer may be required to supply the decode data for each instruction in the application code itself, rather than enabling decode logic 224 to store decode data for subsequent instructions. It will also be appreciated that while FIG. 7 shows data flowing directly from a source register 260 through stages 262 of execution logic 212 and onto destination register 264, the source and destination registers 260, 264, need not be the same register, and furthermore, the data will typically be altered within one or more of stages 262 as the result of processing an instruction.

In addition, it will be appreciated that the manner in which decode data is manipulated in execution logic 212 may vary in different embodiments. For example, decode data may be treated as the least significant bits of the significand and manipulated in the same manner in which floating point values having the full 23 bits of significand data are treated. While doing so may introduce inaccuracies and the floating point calculations, the inaccuracies will typically be below the degree of precision required, and thus may be rounded off and/or effectively ignored. In the alternative, decode logic 224 may zero out the decode portion of a source register as the source register is fed to the execution logic 212. As another alternative, execution logic 212 may be configured to truncate the decode data from the significand responsive to decode logic 224.

Of note, unlike multi-stage decoding (e.g., using primary and secondary opcodes) that may be implemented in some conventional architectures, where an instruction is fully decoded prior to retrieving the operand registers to be processed by the instruction, data dependent instruction decoding consistent with the invention performs at least a portion of the decode of the instruction after decode data has been retrieved from an operand register. A portion of the decoding may still be performed prior to retrieving operand registers, however, at least a portion of the decoding occurs after data from at least one operand register has been retrieved.

To further illustrate the operation of the illustrated embodiments of the invention, a specific application of the invention in connection with graphics processing is discussed. Consider, for example, that it was desirable to add a new class of floating point instructions to an ISA, e.g., to the Power Architecture governed by the Power.org standards organization. It might be desirable to support 64 registers, including support for referencing up to three source (operand) registers and a separate destination (target) register in each instruction. As such, each register field in the instruction would require six bits of address information, for a total of 24 bits.

Assuming a six bit primary opcode field as is used in the Power Architecture, a 32-bit instruction encoding would leave only two bits for an extended opcode, thus allowing for only 4 possible instructions in this new type of instruction class, severely limiting the usefulness of the instruction class. For instance, in order to support typical floating point calculations, an instruction class might require several different types of instructions, e.g., addition, subtraction, multiplication, fused multiply-add operations, division, exponentiation, trigonometric operations, comparison operations, and others.

Conventionally, this limitation could be mitigated by making three-source operations destructive, such that the target and one source address would be implicitly equal, and one address field in the above example would not be needed, freeing up space for additional extended opcodes. In many instances, however, destructive operations are often not convenient for compilers and software engineers, because often times an extra copy of the source data that would be overwritten by the destructive operation needs to be saved away in a temporary register, which can have potential performance problems in addition to using valuable temporary register space.

Alternatively, a designer could implement only the four most important or most often used instructions, and implement the remaining instructions such as logarithm and exponentiation instructions with a slower Taylor series software approximations. Doing so, however, would have serious performance disadvantages for many applications.

For example, specular highlights are widely used in 3D graphics to simulate the reflection of a light source on a surface. In many real time graphics applications such as games, per-pixel illumination calculations are employed for graphics realism. This means that for each pixel in a given frame, a specular calculation must be performed, causing the specular algorithm to be performance-critical. However, since the human eye can only discern a quantum change in intensity of about $2^{-8}$, for performance reasons many times the special instructions needed to calculate specular highlights are implemented as estimates rather than fully accurate versions. For instance, the base two logarithm and power of two floating point instructions used in specular highlighting may only use the most significant 10 bits of the floating point fraction and still provide adequate quality results.

To produce these specular highlights, the intensity is calculated as:

$$\text{Intensity} = 2^{k\,\log_2[\cos(\Theta)]}$$

where k is a property of the surface (a higher number implying a smoother surface) and $\Theta$ is the angle between the ray connecting the surface with the eyepoint, and the ray representing the reflection off the surface from the light source.

In order to implement such calculations on an architecture such as a Power Architecture, e.g., using VMX instructions, an instruction stream such as is shown in Table I below may be used:

TABLE I

Conventional Specular Highlighting Code

| | |
|---|---|
| # the V4 register contains the Cos(theta) value | |
| # V5 contains the k value | |
| vlogefp V3, V4 | # Compute the estimated log base 2 of |
| | #   Cosine theta |
| vmulfp V2, V3, V5 | # Multiply the log result by k |
| vexptefp V1, V2 | # Compute the estimated value of 2 to the |
| | #   power of the result from the multiply |

Three separate floating point instructions are therefore required. In addition, it should be noted that if this routine was implemented via a Taylor series expansion or lookup table there would be serious performance disadvantages.

The herein-described embodiments, however, may alleviate the drawbacks associated with implementing calculations in such applications by repurposing some of the bits in a floating point register for use in decoding an operation to be performed by a particular instruction. As noted above, since many computing applications such as computer graphics do not necessarily use the full precision that is often implemented in computing hardware such as IEEE 754 single precision floating point arithmetic, a limited number of the least significant bits of the register data can be used for instruction decode purposes, often with little or no adverse impact on the resulting floating point calculations.

To implement data dependent instruction decoding in the embodiments described herein, a single opcode (referred to herein as a "vspec" opcode) may be used to represent multiple instruction types. In addition, it may be assumed that when the special opcode is present, the decode data will be in the first source register identified by the instruction.

Continuing with the specular highlighting example, the decode data may be selected from one or more decode values that are individually associated with different operations or instructions/instruction types. For example, assuming 8 bits of decode data, a decode value of 0x00 may decode to a viogefp instruction, a decode value of 0x01 may decode to a vmulfp instruction, and a decode value of 0x02 may decode to a vexptefp instruction. A decode value of 0x03 may decode to a "complete" indication to notify the supplemental decode logic that no additional instructions should be expected in the sequence. In the alternative, no "complete" decode value may be required. While other instructions are not required to implement a specular calculation, it will be appreciated that with this architecture up to 256 different instructions may be supported with 8 bits of decode data.

Using the aforementioned mapping, a Power-compatible processing unit consistent with the invention may perform a specular highlighting calculation using the instruction stream in Table II below:

TABLE II

Data Dependent Instruction Decode Specular Highlighting Code

```
# the V4 register contains the Cos(theta) value, with the last
    byte equal to 0x00
# V5 contains the k value
vspec V3, V4    # Since the last byte of V4 == 0x00,
                #   decodes as a vlogefp
                # Then, the last byte of V3 is set to
                #   0x01 by next instruction sequencer
vspec V2, V3, V5 # Since the last byte of V3 is 0x01,
                #   this decodes as a vmulfp
                # Then, the last byte of V2 is set to
                #   0x02 by next instruction sequencer
vspec V1, V2    # Since the last byte of V2 is 0x02,
                #   this decodes as a vexptefp
                # Then, the last byte of V1 is set to
                #   0x03 to show complete
```

The vspec instructions all use only one 6 bit primary opcode instead of 3 for viogefp, vmulfp, and vexptefp. The execution unit's additional decode circuitry determines what operation the execution logic should perform based on the last byte of the first identified source register. If the current instruction is not one of the vspec instructions, the source and target data is treated as normal for that instruction. Desirably, none of the vspec instructions use the last byte of the source in their respective arithmetic operations to avoid data corruption.

The embodiments described herein therefore allow multiple associated operations to share the same instruction opcode, thereby minimizing the impact of using available instruction decode space and allowing for larger registers to be addressed easily in a processor instruction. Various modifications may be made to the illustrated embodiments without departing from the spirit and scope of the invention. For example, other manners of encoding decode data into a register may be used, e.g., in other locations in a register, using various encoding schemes, and in different types of registers (e.g., fixed point registers). Other modifications will be apparent to one of ordinary skill having the benefit of the instant disclosure. Therefore, the invention lies in the claims hereinafter appended.

What is claimed is:

1. A method of executing floating point instructions from an instruction set, wherein the instruction set defines a plurality of floating point instruction types respectively associated with a plurality of opcodes, wherein a first opcode among the plurality of opcodes is associated with a plurality of floating point operations, and wherein each floating point operation among the plurality of floating point operations is associated with a decode value among a plurality of decode values, the method comprising, in response to receiving a first floating point instruction:

performing a primary decode of the first floating point instruction based upon an opcode associated therewith; and in response to determining that the opcode associated with the first floating point instruction matches the first opcode:

retrieving a first floating point register identified by the first instruction from a floating point register file, wherein the first floating point register stores an exponent in an exponent portion thereof, a significand in a most significant subset of a significand portion thereof and a decode value in a least significant subset of the significand portion thereof;

after retrieving the first floating point register, performing a supplemental decode of the first floating point instruction using the decode value stored in the first floating point register to identify a first floating point operation from among the plurality of floating point operations that is associated with the decode value stored in the first floating point register; and after performing the supplemental decode of the first floating point instruction, executing the first floating point instruction in a floating point execution unit by performing the first floating point operation using the exponent and significand stored in the first floating point register.

2. The method of claim 1, wherein the plurality of floating point operations are associated with a predetermined sequence of floating point operations, the method further comprising, in response to determining that the opcode associated with the first floating point instruction matches the first opcode:

determining a next floating point operation relative to the first floating point operation in the predetermined sequence of floating point operations; and storing a decode value associated with the next floating point operation in the least significant subset of the significand portion of a second floating point register such that, during execution of a second floating point instruction that is associated with an opcode that matches the first opcode and that identifies the second floating point register, the second floating point instruction is executed by performing the next floating point operation in the predetermined sequence of floating point operations.

3. A circuit arrangement, comprising:

a register file including a plurality of registers, the plurality of registers including a first register, the first register storing operand data in an operand portion thereof and decode data in a decode portion thereof;

execution logic coupled to the register file and configured to execute a first instruction that identifies the first register in the register file, wherein the execution logic is further configured to use the operand data stored in the operand portion of the first register as input data during execution of the first instruction; and decode logic coupled to the execution logic and configured to use the decode data stored in the decode portion of the first register identified by the first instruction to decode the first instruction.

4. The circuit arrangement of claim 3, wherein the execution logic is configured to use the operand data stored in the operand portion of the first register as input data for a floating point operation during execution of the first instruction.

5. The circuit arrangement of claim 4, wherein the first register comprises a floating point register that includes an exponent portion and a significand portion, wherein the operand portion includes the exponent portion and a first subset of the significand portion and the decode portion includes a second subset of the significand portion.

6. The circuit arrangement of claim 5, wherein the second subset of the significand portion comprises a plurality of least significant bits from the significand portion.

7. The circuit arrangement of claim 3, wherein the decode data selects from among a plurality of operations such that the decode logic causes the execution logic to perform a selected operation from among the plurality of operations during execution of the first instruction responsive to the decode data.

8. The circuit arrangement of claim 7, wherein the first instruction is among a plurality of instructions in an instruction stream having the same opcode, wherein each of the plurality of operations is associated with a unique decode value, wherein the decode logic further comprises sequencer logic configured to sequentially output decode values from a predetermined sequence of decode values in response to execution of the plurality of instructions, and wherein the execution logic is configured to store decode values output by the sequencer logic in the decode portion of a destination register during execution of each instruction among the plurality of instructions in the instruction stream such that a next executed instruction from among the plurality of instructions in the instruction stream will be decoded using the decode value stored in a register by a previously execution instruction from among the plurality of instructions in the instruction stream.

9. The circuit arrangement of claim 7, wherein the execution logic is configured to execute instructions from among a plurality of instruction types in an instruction set, wherein the plurality of instruction types includes a first instruction type associated with a first opcode and a second instruction type associated with a second opcode, wherein the decode logic is configured to use the decode data to decode the first instruction only if an opcode for the first instruction matches the first opcode for of the first instruction type, and wherein the decode logic is configured to skip decoding of a second instruction including an opcode that matches the second opcode during execution of the second instruction by the execution logic.

10. The circuit arrangement of claim 9, wherein the second instruction identifies the first register, and wherein the execution logic is configured to use data stored in the decode portion of the first register as input data during execution of the second instruction.

11. The circuit arrangement of claim 3, wherein the decode logic comprises supplemental decode logic, and wherein the circuit arrangement further comprises primary decode logic separate from the supplemental decode logic and configured to decode instructions based on opcodes associated with such instructions.

12. The circuit arrangement of claim 3, wherein the execution logic is configured to store decode data in the decode portion of a destination register during execution of the first instruction such that, during execution of a second instruction that identifies the destination register by the execution logic, the decode logic uses the decode data stored in the decode portion of the destination register to decode the second instruction.

13. The circuit arrangement of claim 12, wherein the execution logic is further configured to store result data in a result portion of the destination register.

14. An integrated circuit device including the circuit arrangement of claim 3.

15. A program product comprising a computer recordable medium and logic definition program code resident on the computer recordable medium and defining the circuit arrangement of claim 3.

16. A method of executing instructions using execution logic coupled to a register file, the method comprising:
executing a first instruction that identifies a first register from the register file using the execution logic, wherein the first register stores operand data in an operand portion thereof and decode data in a decode portion thereof, and wherein executing the first instruction includes using the operand data stored in the operand portion of the first register as input data; and
during execution of the first instruction, using the decode data stored in the decode portion of the first register identified by the first instruction to decode the first instruction.

17. The method of claim 16, wherein executing the first instruction includes performing a floating point operation using the operand data stored in the operand portion of the first register as input data.

18. The method of claim 17, wherein the first register comprises a floating point register that includes an exponent portion and a significand portion, wherein the operand portion includes the exponent portion and a first subset of the significand portion and the decode portion includes a second subset of the significand portion, and wherein the second subset of the significand portion comprises a plurality of least significant bits from the significand portion.

19. The method of claim 16, wherein using the decode data stored in the decode portion of the first register identified by the first instruction to decode the first instruction includes using the decode data to select a selected operation from among a plurality of operations for execution.

20. The method of claim 19, wherein the first instruction is among a plurality of instructions in an instruction stream having the same opcode, wherein each of the plurality of operations is associated with a unique decode value, the method further comprising:
using sequencer logic to sequentially output decode values from a predetermined sequence of decode values in response to execution of the plurality of instructions; and
storing decode values output by the sequencer logic in the decode portion of a destination register during execution of each instruction among the plurality of instructions in the instruction stream such that a next executed instruction from among the plurality of instructions in the instruction stream will be decoded using the decode value stored in a register by a previously execution instruction from among the plurality of instructions in the instruction stream.

21. The method of claim 19, wherein the execution logic is configured to execute instructions from among a plurality of instruction types in an instruction set, wherein the plurality of instruction types includes a first instruction type associated with a first opcode and a second instruction type associated with a second opcode, wherein using the decode data stored in the decode portion of the first register identified by the first instruction to decode the first instruction is performed only if an opcode for the first instruction matches the first opcode for of the first instruction type, the method further comprising skipping using the decode data to decode a second instruction including an opcode that matches the second opcode during execution of the second instruction by the execution logic.

22. The method of claim 21, wherein the second instruction identifies the first register, and wherein the execution logic is configured to use data stored in the decode portion of the first register as input data during execution of the second instruction.

23. The method of claim 16, further comprising performing a primary decode of the first instruction based upon an opcode associated with the first instruction, wherein using the decode data stored in the decode portion of the first register identified by the first instruction to decode the first instruction performs a supplemental decode of the first instruction.

24. The method of claim 16, further comprising storing decode data in the decode portion of a destination register during execution of the first instruction such that, during execution of a second instruction that identifies the destination register by the execution logic, the decode data stored in the decode portion of the destination register is used to decode the second instruction.

25. The method of claim 24, further comprising storing result data in a result portion of the destination register.

* * * * *